(12) United States Patent
Wolfer et al.

(10) Patent No.: US 7,994,690 B2
(45) Date of Patent: Aug. 9, 2011

(54) COMPONENT FOR PIEZOELECTRIC FORCE OR PRESSURE SENSORS, HELD TOGETHER BY AN ELECTRICALLY INSULATING FILM

(75) Inventors: Peter Wolfer, Kleinandelfingen (CH); Claudio Cavalloni, Regensdorf (CH); Reinhold Hess, Winterthur (CH); Michael Mueller, Attikon (CH); Andrea Bertola, Zurich (CH); Christoph Kern, Aspach (DE); Steffen Schott, Schwieberdingen (DE); Pavlo Saltikov, Waiblingen (DE); Michael Kleindl, Schwieberdingen (DE); Reiko Zach, Remseck (DE)

(73) Assignee: Kistler Holding AG, Winterthur (CH)

( * ) Notice: Subject to any disclaimer, the term of this patent is extended or adjusted under 35 U.S.C. 154(b) by 736 days.

(21) Appl. No.: 11/815,622

(22) PCT Filed: Feb. 22, 2006

(86) PCT No.: PCT/CH2006/000111
§ 371 (c)(1),
(2), (4) Date: Jun. 3, 2008

(87) PCT Pub. No.: WO2006/089446
PCT Pub. Date: Aug. 31, 2006

(65) Prior Publication Data
US 2009/0026889 A1    Jan. 29, 2009

(30) Foreign Application Priority Data
Feb. 24, 2005 (CH) ........................... 0335/05

(51) Int. Cl.
*H01L 41/113* (2006.01)
(52) U.S. Cl. ...................................... 310/338

(58) Field of Classification Search .................. 310/330, 310/338, 339, 334, 328, 311; 73/114.19, 73/114.18, 115, 754; *H01L 41/113*
See application file for complete search history.

(56) References Cited

U.S. PATENT DOCUMENTS

| | | | |
|---|---|---|---|
| 4,566,316 A * | 1/1986 | Takeuchi | 73/754 |
| 4,577,510 A | 3/1986 | Bur et al. | |
| 6,923,042 B2 * | 8/2005 | Hiramatsu | 73/114.19 |
| 6,979,801 B2 * | 12/2005 | Okazaki et al. | 123/145 A |
| 2007/0062267 A1 * | 3/2007 | Boucard et al. | 73/115 |
| 2009/0301178 A1 * | 12/2009 | Winklhofer et al. | 73/114.19 |

FOREIGN PATENT DOCUMENTS

| | | |
|---|---|---|
| DE | 196 80 912 T1 | 10/1997 |
| EP | 1 111 360 A2 | 6/2001 |
| EP | 1 460 403 A1 | 9/2004 |

OTHER PUBLICATIONS

PCT/CH2006/000111-International Preliminary Report on Patentability, International Filed date Feb. 22, 2006.

* cited by examiner

*Primary Examiner* — Walter Benson
*Assistant Examiner* — Karen B Addison
(74) *Attorney, Agent, or Firm* — Dority & Manning, P.A.

(57) ABSTRACT

The invention relates to a component for installation in force or pressure sensors, in particular in a glow plug. The component comprises a disc-type or punched-disc type measuring element consisting of a piezoelectric material, punched-disc type or disc-type electrodes that lie on either side of the measuring element. The electrodes have contact points for contacting conductors. The component comprises in addition a respective transmission body or several transmission bodies that are located outside the electrodes, on either side of the latter. The measuring element, electrodes and transmission bodies are held together mechanically by an external, electrically insulating film.

20 Claims, 2 Drawing Sheets

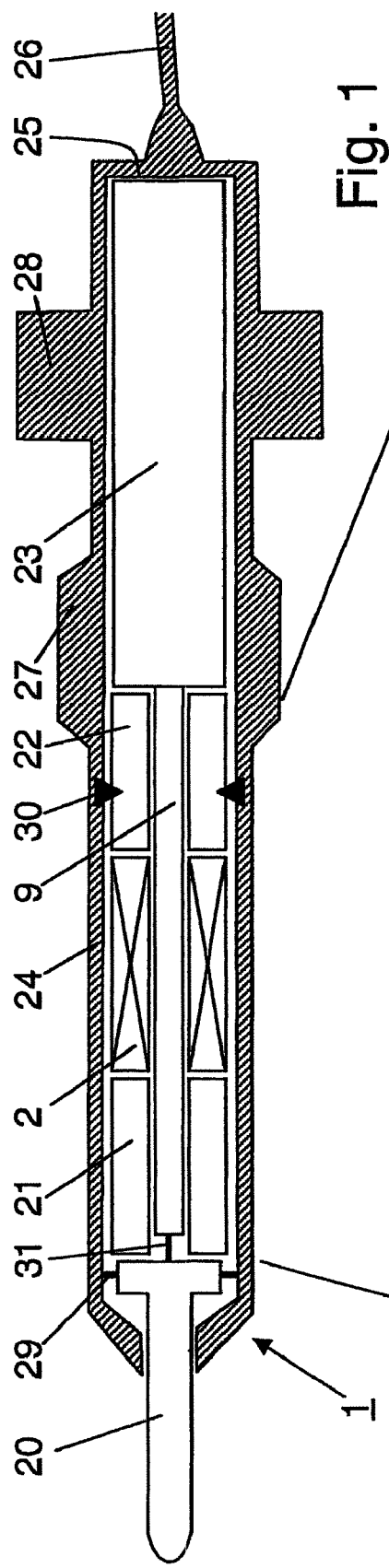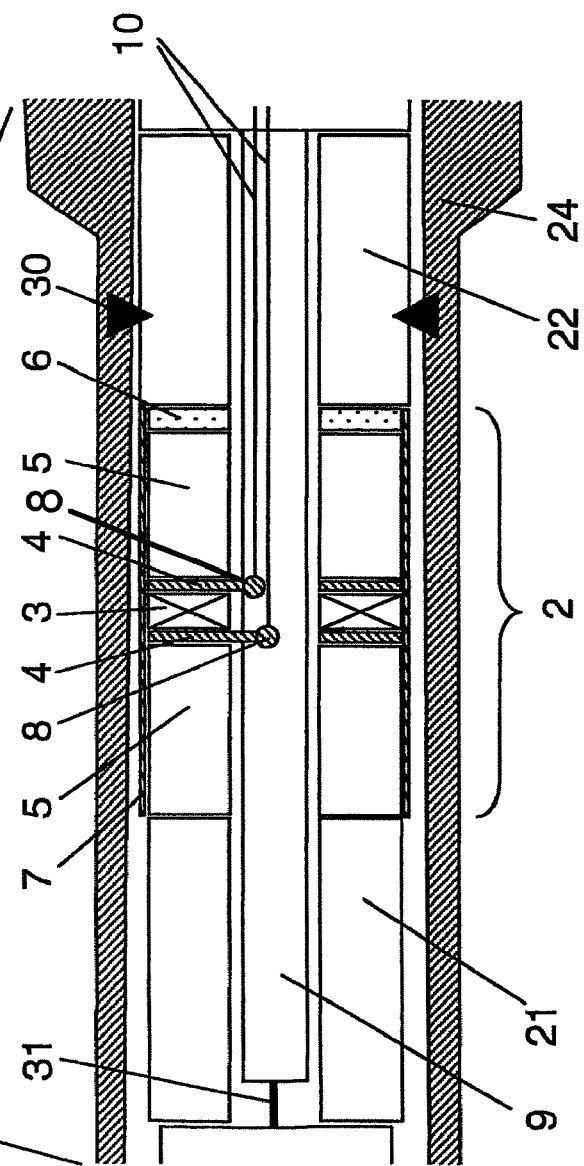
Fig. 1
Fig. 2

COMPONENT FOR PIEZOELECTRIC FORCE OR PRESSURE SENSORS, HELD TOGETHER BY AN ELECTRICALLY INSULATING FILM

CROSS-REFERENCE TO RELATED APPLICATIONS

This application claims priority to Swiss Application No. 335/05 filed Feb. 24, 2005, and International Application Serial No. PCT/CH2006/000111 filed Feb. 22, 2006.

TECHNICAL FIELD

The present invention relates to a component for installation in force or pressure sensors comprising a measuring element including piezoelectric material.

PRIOR ART

Sensors comprising elements of that type are for example used in combustion chambers such as in glow plugs.

From DE 196 80 912 C2A is known a glow plug with built-in pressure sensor wherein a sensor of a heating section is admittable by the cylinder pressure of a Diesel engine and wherein the sensor is held in position by a fixing element on its back side.

From DE 10205819 is known another arrangement which serves the same purpose wherein a piezo-ceramic element is arranged between two electrodes having contact points.

DE 10218544 A1 also describes a glow plug with a built-in pressure sensor which shows a similar construction.

All these arrangements require a very difficult assembly and therefore are unsuitable for series production.

Sensors are usually produced by manufacturers who prefabricate and assemble the required components with expertise and ensuring the necessary accuracy. However, if individual components are supplied to a manufacturer performing the final assembly in the sensor, for example a glow plug, other demands must be met. On the one hand, the components must be transported without suffering damages. On the other hand the installation into the sensor should be simplified to minimize the risk of errors due to a lack of accuracy. Furthermore, there are increasing demands for large quantities so that series production, i.e. automated assembly, is required.

OBJECTS AND SUMMARY

It is an object of the present invention to suggest a force or pressure measuring component of the type mentioned in the beginning which is suitable for serialized installation in sensors. A preferred application is the use in glow plugs. This poses high demands with respect to simple, automated manufacturing as well as to production costs. Furthermore, the component shall meet the requirements of transport and handling until their installation into the sensor or into the glow plug. In particular, it is necessary that the individual constituents of the component are not displaced one with respect to the other.

This object has been achieved by the characteristics of the independent claim.

The necessary constituents of the components for force or pressure measurements, for example by installation into a glow plug, comprise a measuring element made of piezoelectric material surrounded by two electrodes which themselves are surrounded by two transmission bodies. In the embodiment of the invention, all these constituents are of the disc type, the punched-disc type or cylindrical and can be joined together to form a row or string. The thought underlying this invention is to hold these constituents together in their string-like, centered arrangement by means of a thin insulating film to form a component. This film can be applied very easily in an automatic manner, for example by means of shrinkable tubing or by a lacquering, and serves also the purpose of preserving the centering of all constituents of the component of the invention. Due to this fact it is no longer necessary for the other components of the sensor or the glow plug which surround the component in the installed state to meet high demands.

BRIEF DESCRIPTION OF THE DRAWINGS

In the following the invention will be explained in more detail with respect to the drawings. The Figures show FIG. 1 a schematic representation of a preferred arrangement in a glow plug shown in cross section;

FIG. 2 a schematic representation of a portion of a preferred glow plug shown in cross section in the region of the component of the invention.

DETAILED DESCRIPTION OF THE ILLUSTRATIVE EMBODIMENTS

Figure 3:
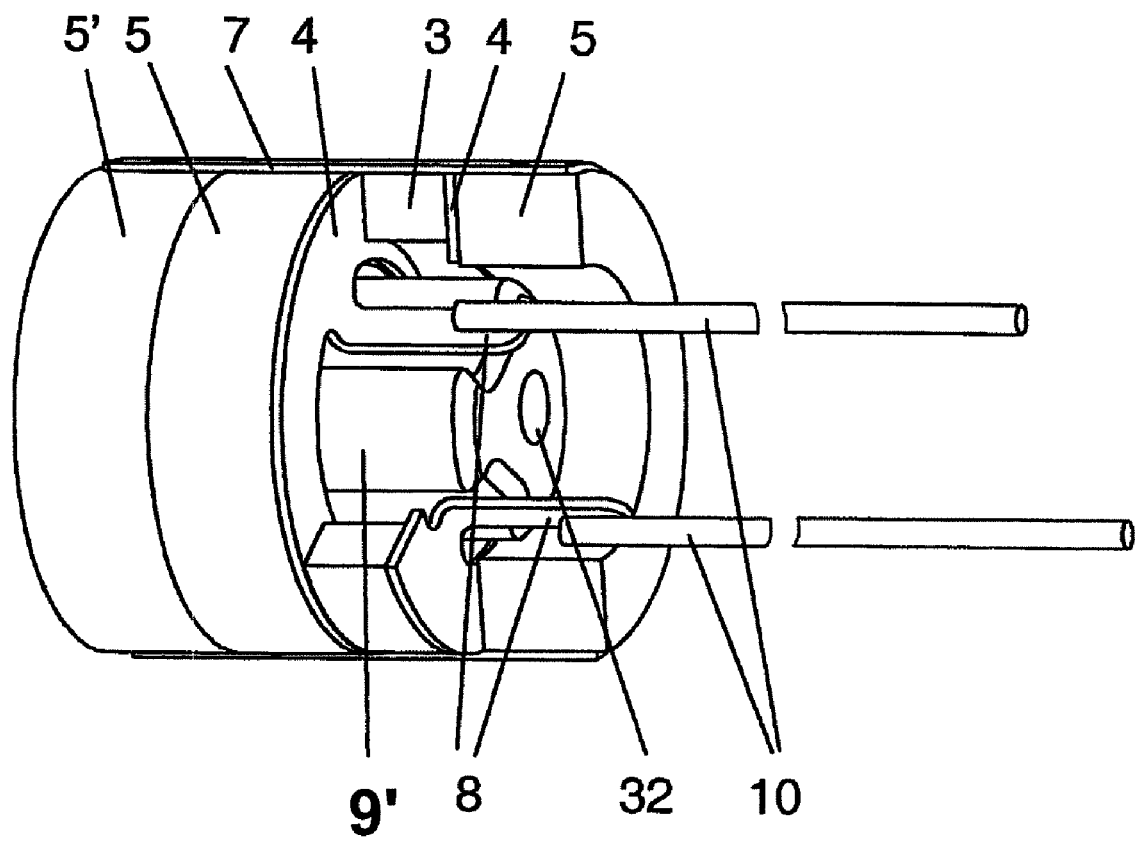
FIG. 3 a perspective view of a component of the invention.

FIG. 1 shows one possible embodiment as an application of the component 2 of the invention in a glow plug 1. The Figure shows a schematic representation of a preferred glow plug 1 in cross section. It comprises a housing 24 having inserted in its front portion a glow pin 20 which protrudes from the housing. Behind the glow pin 20 and adjacent thereto there may be arranged a force transmission sleeve 21 after which the component 2 according to the invention is installed. Alternatively, the component 2 can also be arranged directly behind the glow pin. Following the component 2 there is a fixation 22 abutting to the back side of a connecting element 23. The connecting element 23 is attached at its rear end to a recess 25 of the housing 24. Alternative constructions having the same effects are possible as well. In particular, the fixation 22 may be welded to the housing 24 at a welding site 30 whereby force is no longer transduced via the connecting element 23 to the recess 25 of the housing 24.

For the installation of the glow plug 1 in a bore provided for this purpose in a cylinder head, the housing 24 usually possesses a thread 27 and a hexagonal bolt 28 serving as a point of contact for a tool. The welding site 30 in this case is in the region between the thread 27 and the glow pin 20. To avoid erroneous effects on the measurements due to stressing of the glow plug 1 during installation the welding site 30 can be preferably positioned at an intermediate sleeve (not shown) separate from the housing and not directly at the housing 24.

The hindmost region of the glow plug 1 contains the port for the wiring 26 which also comprises conductors for the component 2. In the foremost region of the glow plug 1 there is a membrane 29 sealing the interior of the housing 24 from the combustion chamber. By means of this membrane 29 a desired prestress can also be applied to the component 2.

A pressure in the combustion chamber is transmitted via the glow pin 20 and, if present, the force transmission sleeve 21 onto the component 2 which is supported by the housing 24 via the fixation 22. In this embodiment, the force transmission sleeve 21, component 2 and connecting element 23 are supported by a pin 9 extending centrally through these constituents. This pin 9 has no effect on force transmission. The pin 9 comprises a glow current wire 31 for heating the glow pin 20 or accommodates it centrally. Preferably, at least a part of the force transmission sleeve 21 is made of heat-insulating material so that the component 2 is less subjected to the heat load of the combustion chamber.

FIG. 2 shows a detailed section of FIG. 1 in the area of component 2. Component 2 comprises various constituents which in this example are disc-like, punched-disc-like or cylindrical. These constituents preferably have identical outer diameters. A measuring element 3 forms the core portion of component 2. It is preferably made of piezoelectric material, for example of piezoelectric crystal or piezoelectric ceramic. This measuring element 3 is surrounded on either side by an electrode 4 which is itself surrounded on either side by a transmission body 5. Alternatively, each of the electrodes 4 can also be made integral with its neighboring transmission body 5. The electrodes serve to collect the charges arising in the case of force or pressure application on both sides of the measuring element 3 and transfer them to the contact sites 8 provided for this purpose. These contact sites 8 are preferably located on the inner side or in the center of the electrodes. This is an advantage since there is usually not enough space on the outer side between the component 2 and the housing 24 for leading away the conductors.

The transmission bodies 5 serve different functions. Preferably, at least one of the transmission bodies 5 is an expansion body compensating the thermal expansions of the housing 24. The other transmission body 5 can be an expansion body, an electrical insulator 6, another body or a combination thereof. The transmission bodies 5 further serve the function to mechanically protect the measuring element 3 with the electrodes 4 on both sides.

In a preferred embodiment at least the transmission body 5 on the front behind the glow pin 20 is also a thermal insulator. This has the advantage that the component 2 installed behind the transmission body is subjected to a lower temperature and thus has to comply lower requirements.

These constituents, measuring element 3, electrodes 4 and transmission body 5, are held together in a central position by means of a thin outer insulating film 7. For this purpose, these constituents preferably have essentially identical outer diameters. This film 7 preferably must make sure that the constituents mentioned 3, 4 and 5 are not displaced with respect to each other until the component 2 is installed in a glow plug or another sensor. At this time, the component 2 is placed under prestress which precludes later displacement of these constituents. Following installation in a glow plug 1 or in a sensor the insulating film 7 is only responsible for insulation.

Until it is built in to constitute the sensor, the component is in a state in which it is not or insignificantly prestressed. However, a small prestress of at most 5 N/mm$^2$ may be created upon installation of the insulating film 7. In a pressure-receiving area of typically 10-20 mm$^2$ this corresponds to a total maximum load of 50 to 100 N. In most cases, however, the prestress will not be more than 10 N. The prestress applied to the component 2 later upon installation in the sensor usually is a multiple of this value but at least 200 N.

The film 7 consists for example of a shrinking tube or of a lacquering and preferably is not thicker than about 0.2 mm. In any case, the layer thickness of the film 7 should be less than $\frac{1}{10}$, preferably less than $\frac{1}{20}$ of the diameter of the component 2. In this way the measuring element 3 can have as large a pressure pick-up area as possible whereby the sensitivity is not unduly restricted. Preferably, the electrical insulation should be at least about 10$^{13}$ Ohms at 150° C. If shrinking tube is used these data apply to the finished shrunken state. The tube should shrink preferably at 200° C. and fit tightly also at high temperatures of about 150° C.

This arrangement is mainly characterized by its simplicity resulting in a cost-effective production which may be automated. Prior to the application of the insulating film 7 all constituents of component 2 are centered. The film 7 ensures that the centering is retained until the component 2 has been installed in the sensor and prestressed. Thus there is no need for elaborate centering during the installation into the glow plug 1. In contrast to other elements for the same applications in which one of the electrodes is connected to the housing the component 2 is also ground-insulated due to the present structure. This ground insulation is prescribed by regulations in many countries for all elements in an automobile.

For installation into the glow plug 1 the component 2 is brought over the pin 9. On either side of the component 2 there must be applied an electrical insulator 6. This insulator can be already integral to one side or both sides of the component 2 or to the adjacent constituents, for example in the pressure transmission sleeve 21 and/or to the fixation 22. Alternatively, it can also be strung onto the pin 9 as an additional constituent. In this case it can be fastened by means of the insulating film 7 as are the other constituents of the component 2. In addition, two insulators 6 on either side external to the transmission bodies 5 can be joined by the insulating film 7.

Advantageously, the component 2 is arranged in the front portion of the glow plug 1 which in the installed state is in the region of the glow plug bore of the cylinder head. Accordingly, the component 2 preferably is arranged in front of or in the region of the thread 27. This ensures on the one hand that it is not heated to more than 220° C. because the cylinder head is cooled. Another advantage of this position of installation is that the closer the component 2 is situated at the pressure chamber, i.e. the combustion chamber, the smaller is the measurement error.

Another advantage of this installation position of the component 2 is that in this way there is space for an integrated amplifier in the rear region of the glow pin, for example in the area of the connecting element 23. In this manner an already amplified output signal can be transmitted by the wiring 26.

A prerequisite for installation of the component 2 in the front region is, however, that the component 2 has an outer diameter of 6 mm at the most, preferably 5 mm at the most, to find room in a glow plug 1 having an M8 thread 28. The length of the component typically is between about 6 and 15 mm.

At the contact points 8 which protrude on the inner side of the electrodes there may be connected insulated or uninsulated conductors 10. These extend in a groove of the pin 9 provided for this purpose to the rear region of the glow plug 1 where they are connected either to the integral amplifier or to the wiring 26. On the other hand, the pin 9 may have two integral conductors 10 connected, for example by welding or soldering, to the contact points 8 upon installation into the glow plug 1.

Examples of alternative embodiments for applications in a glow plug are described in FIG. 3. It may be considered that the pin 9 is not inserted in the glow plug so that the glow current wire 31 is accessible. For its guidance and to avoid at the same time any contact between the glow current wire 31 and the conductors 10 the component 2 may be provided with a guiding pin 9' which can be another constituent of the component 2 or can be attached at one of the constituents of the component 2 already mentioned, for example at one of the transmission bodies 5 or at another transmission body 5' and integral therewith. The transmission body 5' can have individual or several of the possible characteristics of the transmission body 5 mentioned.

In particular, this guiding pin 9' can be formed as a disc having the necessary, preferably three, passages 32 and/or openings for the glow current wire 31 and the two conductors 10. Alternatively, this guiding pin 9' may have the form of a pin which approximately extends over the length of the component 2 or even projects therefrom. This guidance particularly performs the function of thermally and electrically insulating the conductors 10 from the glow current wire 31 so that it is no longer absolutely required to insulate the conductors 10. In another embodiment the guiding pin 9' has the same length as the component to which it is attached or with which it is integral.

The advantage of a component (2) according to the invention of this type is that the component is held together as an entity while the diameter of the measuring element 3 must not be substantially smaller than in the case when the necessary constituents are built into the sensor individually. Furthermore, no additional centering of the constituents during installation is required.

Components 2 of this type can also be installed in other sensors, for example in force sensors. The use of such components 2 specifically has the advantage that no particular caution must be exercised to avoid a short circuit since the component is electrically insulated on its external side. In particular, disc-like measuring elements 3 can be used for such purpose if nothing has to be passed through the center. As an alternative to the arrangement described, conductors 10 of either electrode 4 can be led out of the component on both sides of the measuring element 3. A great advantage, however, is the automated production of the component as well as the possibility for automated installation in a sensor enabling the production in large quantities at modest prices.

LIST OF REFERENCE NUMERALS 1 glow plug
2 component
3 measuring element
4 electrode
5 5' transmission body
6 insulator
7 insulating film
8 contact point
9 pin;
9' guiding pin
10 conductor
20 glow pin
21 force transmission sleeve
22 fixation
23 connecting element
24 housing
25 recess
26 wiring
27 thread
28 hexagon
29 membrane
30 welding site
31 glow current wire
32 central guidance

The invention claimed is:

1. A component for installation in force or pressure sensors comprising a disc-type or punched-disc-type measuring element made of piezoelectric material, punched-disc-type or disc-type electrodes that lie on either side of the measuring element and having contact points for contacting conductors as well as each having one or more transmission bodies arranged on both sides outside of the electrodes, wherein the measuring element, the electrodes and each of the transmission bodies essentially have identical outer diameters and are held together mechanically by an external, electrically insulating film that is wrapped circumferentially around them.

2. A component according to claim 1, wherein at least one of the transmission bodies is formed integrally with its adjacent electrodes.

3. A component according to claim 1, wherein at feast one of the transmission bodies comprises an expansion body.

4. A component according to claim 1, wherein at least one of the transmission bodies comprises an electrical insulator.

5. A component according to claim 1, wherein at least one of the transmission bodies is made of an heat-insulating material.

6. A component according to claim 1, wherein the contact points are in the interior of the component.

7. A component according to claim 1, wherein at least one conductor is connected to the contact points.

8. A component according to claim 1, further comprising a centrally arranged pin.

9. A component according to claim 8, wherein the pin has a central guidance.

10. A component according to claim 8, wherein the pin is attached to one of the transmission bodies or is integral therewith.

11. A component according to claim 1, wherein the insulating film is a shrinking tube.

12. A component according to claim 1, wherein the insulating film is a coating.

13. A component according to claim 1, wherein the insulating film has a layer thickness of less than $1/10$, preferably less than $1/20$ of the diameter of the component.

14. A component according to claim 1, wherein the component in its uninstalled state is not prestressed or prestressed with less than 5 N/mm² or in total with less than 100 N, preferably with less than 10 N.

15. A component according to claim 1, wherein the component has a total diameter of less than 6 mm.

16. A component according to claim 1, wherein the component is assembled by an automated process.

17. A component according to claim 1, wherein the component is suitable for serial installation in a sensor.

18. A component according to claim 1, wherein the insulating film has an electrical insulation of at least $10^{13}$ Ohms at 150° C.

19. A component according to claim 1, further comprising a guiding configured and disposed to guide the conductors.

20. A component according to claim 19, wherein the guiding thermally and electrically insulates the conductors.

* * * * *